United States Patent
Caveney

(10) Patent No.: US 6,614,978 B1
(45) Date of Patent: Sep. 2, 2003

(54) SLACK CABLE MANAGEMENT SYSTEM

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/586,109

(22) Filed: Jun. 2, 2000

(51) Int. Cl.$^7$ .............................................. G02B 6/00
(52) U.S. Cl. ....................................... 385/135; 385/147
(58) Field of Search ................................. 385/135, 134, 385/89, 76, 137, 147, 138, 139, 140, 53

(56) References Cited

U.S. PATENT DOCUMENTS

| | | | |
|---|---|---|---|
| 4,158,754 A | 6/1979 | Yonezaki et al. | 179/98 |
| 4,665,546 A | 5/1987 | Brey et al. | 379/327 |
| 4,776,662 A | 10/1988 | Valleix | 350/96.2 |
| 4,898,448 A | 2/1990 | Cooper | 350/96.2 |
| 5,138,688 A | 8/1992 | Debortoli | 385/135 |
| 5,339,379 A * | 8/1994 | Kutsch et al. | 385/135 |
| 5,363,465 A | 11/1994 | Korkowski et al. | 385/135 |
| 5,448,015 A | 9/1995 | Jamet et al. | 174/68.3 |
| 5,497,444 A | 3/1996 | Wheeler | 385/135 |
| 5,530,954 A | 6/1996 | Larson et al. | 385/135 |
| 5,546,495 A | 8/1996 | Bruckner et al. | 385/135 |
| 5,613,030 A | 3/1997 | Hoffer et al. | 385/135 |
| 5,640,482 A | 6/1997 | Barry et al. | 385/135 |
| 5,689,604 A | 11/1997 | Janus et al. | 385/134 |
| 5,715,348 A | 2/1998 | Falkenberg et al. | 385/135 |
| 5,758,003 A | 5/1998 | Wheeler et al. | 385/134 |
| 5,788,087 A | 8/1998 | Orlando | 211/26 |
| 5,836,551 A | 11/1998 | Orlando | 248/49 |
| 5,898,129 A | 4/1999 | Ott et al. | 174/59 |
| 6,289,159 B1 * | 9/2001 | Van Hees et al. | 385/134 |
| 2001/0031124 A1 * | 10/2001 | McGrath et al. | 385/134 |

* cited by examiner

Primary Examiner—Jean F. Duverne
(74) Attorney, Agent, or Firm—Robert A. McCann; Jay A. Saltzman; Christopher S. Clancy

(57) ABSTRACT

The invention is a slack cable management system for use with a cable management system, having a plurality of spools secured along a frame to receive slack cable. The spools have an elongate substantially half-cylindrical shaft having a curved cable-contacting surface, and a terminal flange. A main spool having a substantially cylindrical shaft to provide bend radius control for cable passing over and under the main spool is also included.

9 Claims, 9 Drawing Sheets

SLACK CABLE MANAGEMENT SYSTEM

RELATED APPLICATIONS

This disclosure is related to the following U.S. patent applications filed on the same date as this application, each of which is owned by the assignee of this application, and the entirety of each of which is hereby incorporated herein by reference:

U.S. Patent Application entitled "Modular Latch and Guide Rail Arrangement for Use in Fiber Optic Cable Management Systems," naming Samuel M. Marrs, Robert R. Brown and John J. Bulanda as inventors.

U.S. Patent Application entitled "Improved Cable Management System," naming Jack E. Caveney and Dale A. Block as inventors.

U.S. Patent Application entitled "Improved Enclosure for Use in Fiber Optic Management Systems, " naming Michael T. Vavrik and Philip B. Chandler, Jr. as inventors.

U.S. Patent Application entitled "Vertical Cable Management System," naming Samuel M. Marrs, Michael T. Vavrik, and Jeff Paliga as inventors.

U.S. Patent Application entitled "Universal Mounting System for a Fiber Optic Management Center," naming Michael T. Vavrik and Philip B. Chandler, Jr. as inventors.

FIELD OF THE INVENTION

The present invention relates to improved methods and apparatus for managing fiber optic connections and fiber optic cables as part of a fiber optic communication system. More particularly, the present invention relates to a system for managing and containing slack fiber optic cable, especially in a high connection-density application such as a telecommunications operations center, wherein numerous in-coming and out-going fiber optic cables meet at a central access point.

BACKGROUND OF THE INVENTION

Within recent years, there has been a rapidly increasing development and use of telecommunications in business and personal activities. Simultaneously, there has been an accelerating trend toward "convergence" in the telecommunications industry. That is, many historically distinct forms of telecommunications, e.g., telephone, data transmission, e-mail, radio, television, videoconference, internet access, and on-line applications, are being combined into a single channel of communication. This combination of factors is causing a paradigm shift in the amount of bandwidth necessary for telecommunications service to modem office buildings. The increased bandwidth requirements cannot be effectively satisfied by traditional copper cables, but, instead, requires switching to fiber optic cable.

Although much attention has been paid to the electrical and electronic techniques for using the bandwidth in fiber optic cable and for interconnecting the signals of copper cable and fiber optic cable, relatively less attention has been given to the unique physical needs of handling, connecting, and maintaining fiber optic cable. However, the mechanical devices that have been developed for handling copper cable do not work well for fiber optic cable because of the relatively delicate, yet technically precise nature of fiber optic cable.

For example, unlike copper cable, fiber optic cable cannot be readily cut and spliced on demand to make a desirable connection fit in the field. Rather, fiber optic cable is purchased in predetermined lengths, with connectors that have been installed in the factory. Field workers must utilize these predetermined lengths of cable, regardless of whether the length is appropriate for the task at hand. When both ends of a fiber optic cable are connected to equipment at two separate points, a certain amount of slack cable is created, as the necessary result of the use of predetermined lengths of cable. Such slack cable ideally should be contained within a limited amount of space, preferably as close to the termination points as possible. At the same time, the relatively fragile and delicate nature of fiber optic cable prohibits bundling excess cable as might be done with copper cable. If fiber optic cable is excessively bent or stressed, the signal within may become seriously disrupted.

Moreover, it must be recognized that an operations center, such as occurs in the field of this invention, typically houses hundreds (and sometimes thousands) of fiber optic cables. It is particularly important that such an operations center provide for installing the fiber optic cables in a manner that secures and protects any excess fiber optic cable without compromising its relatively delicate nature. Yet, in the event that equipment is changed or moved, each individual fiber optic cable must also be maintained in such a manner that it can be identified, isolated, and retrieved without unduly disturbing other fiber optic cables.

These considerations are made all the more acute by the need to increase the number of connections that may be accommodated in a given area. As the connection density increases, the resulting cable congestion becomes a problem, as more and more cables are routed across the system. Therefore, there is a need in the industry for a cable management system that is capable of accommodating the large number of cables necessary to support high connection-density equipment.

It should also be recognized that a fiber optic cable may be connected to a variety of different type devices which are also housed in the operations center, i.e., patch panels of different sizes, splice drawers, connector modules, etc. There is a need within the industry for a fiber optic cable management system that may facilitate the substitution and replacement of one such device by another, without the need to remove or reinstall all of the fiber optic cable associated with the original device. Furthermore, when it is necessary to upgrade or repair equipment, maintaining system operation during these procedures is an important consideration. Consequently, there is need in the prior art for a cable management system organized in a manner that allows for system operation during upgrading or maintenance.

The foregoing problems are made even more difficult because the operations center actually typically comprises a three-dimensional array of devices and fiber optic cables. That is, the operations center typically houses many columns and rows of such racks, with each rack containing a vertical array of devices attached to hundreds and possibly thousands of such fiber optic cables. Each such cable must be identifiable, retrievable, and replaceable, without disrupting the surrounding cables.

Finally, it must be recognized that all of the foregoing problems exist in a commercial environment without a single established standard for size. Historically, products within the "public network" were designed by AT&T and Western Electric, and utilized racks that were 23 inches wide, holding devices and enclosures that were 19 inches wide. The "public network" was then connected at some point to the premises in a particular building. Products intended for a "premises network" were historically based upon racks that were 19 inches wide, holding devices and enclosures that were 17 inches wide. The Telecommunications Act of 1996 has opened and triggered widespread competition within the telecommunications market. However, it has done so without establishing standards vis-á-vis the mechanical aspects of an operations center. Different companies are adopting different physical standards, and the line of demarcation between "public network" and "premises network" products is becoming fragmented and blurred. As a result, there is a particular need for products that can solve the foregoing problems in the context of both public network and premises network environments.

SUMMARY OF THE INVENTION

The above discussed and other drawbacks and deficiencies of the prior art are overcome or alleviated by the high density slack cable management system of the present invention. In accordance with the present invention, the slack cable management system comprises a panel that is secured to a telecommunications network rack, preferably between adjacent network racks, the panel having a plurality of spools secured along the length of the panel to receive slack cable. The spools have an elongate, substantially half-cylindrical shaft and an end flange, the shaft having an upper curved cable-contacting surface to provide bend radius control to cable passing over the spool. The substantially half-cylindrical design of the spools allows the spools to be placed much closer together than is possible with cylindrical spools, without impairing the ability of a field technician to access the spools, and without reducing the amount of slack cable that may be looped over a given spool. A main spool having a fully-cylindrical shaft may be included to provide bend radius control to cable passing over or under the main spool. The spools may be removably secured to the rack or panel.

By enabling the spools to be placed closer together along the panel or rack compared to cylindrical spools, greater flexibility is achieved, in that the field technician may efficiently store slack cable on the system without stretching the cable or creating excessive slack. Additionally, the high spool density allows the system to accommodate slack cable generated by a higher number of connections, allowing for increased connection density. These and other features and advantages of the invention will be apparent to those skilled in the art upon review of the following detailed description of preferred embodiments and drawings.

DETAILED DESCRIPTION OF THE DRAWINGS AND PREFERRED EMBODIMENTS

Figure 1:
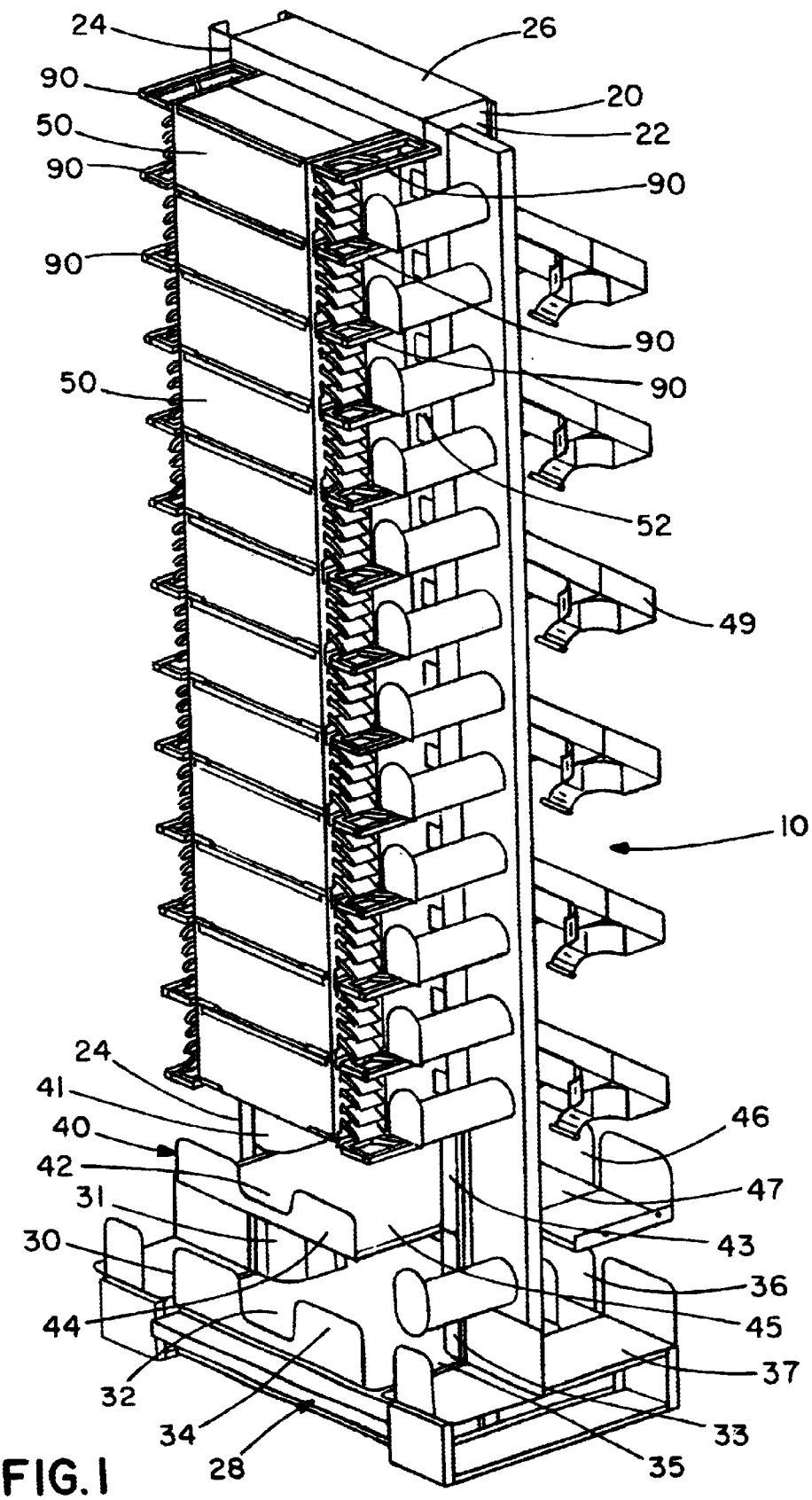
FIG. 1 is perspective view of a cable management system according to the invention.
Figure 2:
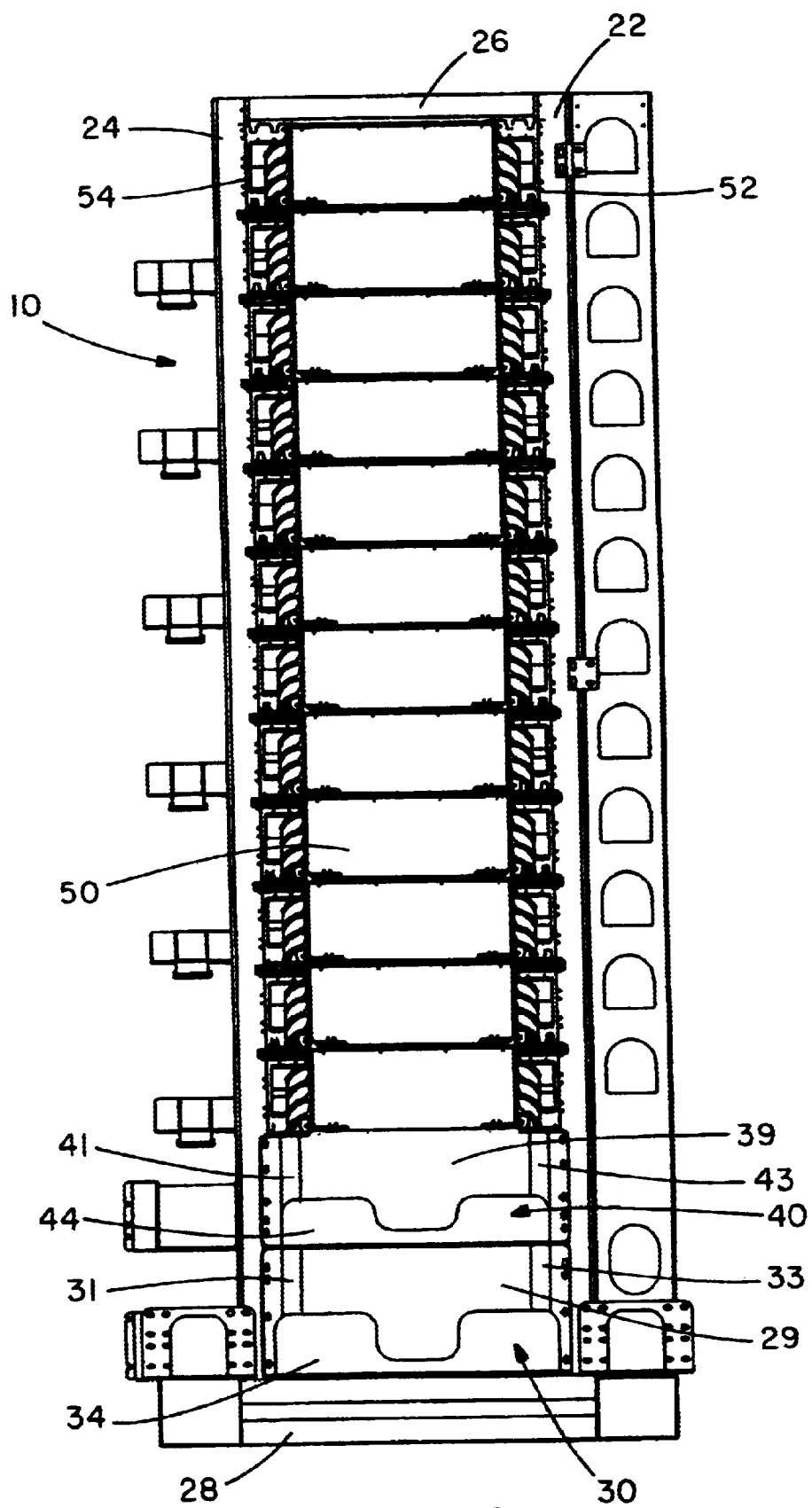
FIG. 2 is a front view of a cable management system according to the invention.

FIGS. 1 and 2 depict a preferred embodiment of the invention, wherein a cable management system 10 includes an open frame 20 having spaced apart vertical side walls 22, 24, connected at one end by a top wall 26 and connected at another end by a base 28 that may be secured to a floor surface (not shown), and defining first and second surfaces of the system. In a preferred embodiment, the first and second surfaces are the front and rear surfaces, respectively, of the system, although other alternative arrangements are possible. Generally, the frame 20 is a conventional telecommunications network rack. A plurality of enclosures 50 are secured to the side walls 22, 24 by mounting brackets 52, 54. The function of the enclosure 50 is to contain fiber optic equipment, such as, for example, connector modules that are used to connect cables running from one enclosure 50 to another, either on the same or different frames 20.

Figure 3:
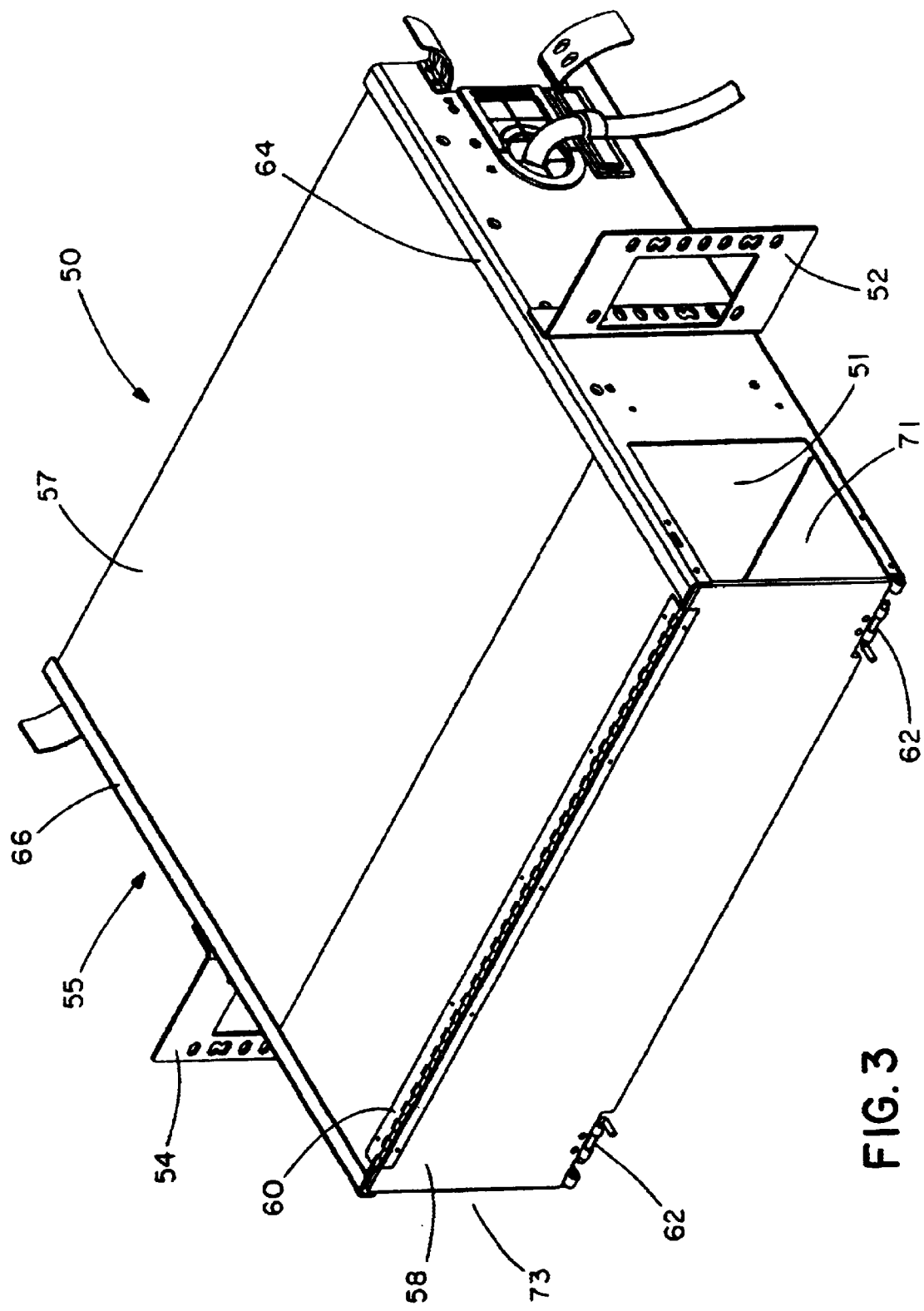
FIG. 3 is a perspective view of an enclosure.

As may be seen in FIG. 3, the enclosure 50 is substantially rectangular, having a floor 51, side walls 53, 55 and a top wall 57, defining a front opening (not shown) and a rear opening not shown), the front opening covered by an enclosure cover 58. In a preferred embodiment, the cover 58 is made of a clear or semi-transparent material, such as Lexan®. The enclosure cover 58 includes a cover hinge 60 and cover latches 62. Cover guide rails 64, 66 act as guides through which the cover 58 slides when opened. Optionally, a detent (not shown) may be included that prevents the cover 58 from sliding too far to the rear when opened. At an end of each sidewall 53, 55 adjacent the enclosure cover an opening 71, 73 to accommodate a fanning guide array is defined. Cables terminating in the enclosure 50 pass through the openings 71, 73 and over the fanning guide array as discussed in detail below.

Figure 4:
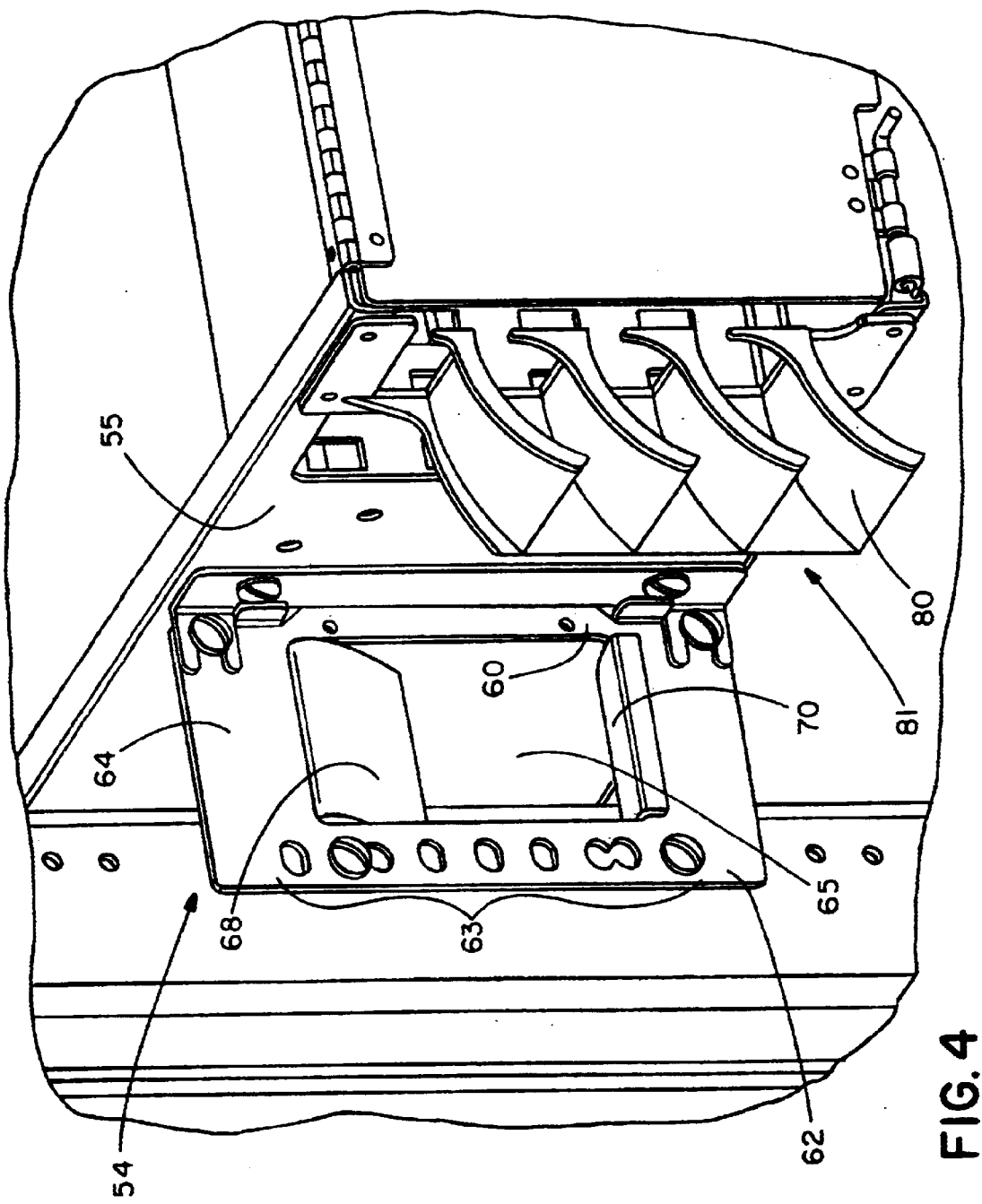
FIG. 4 is a detailed view of a fanning guide and mounting bracket secured to an enclosure.

Referring now to FIG. 4, mounting bracket 54 includes an inner leg 60 and an outer leg 62 connected by first and second cross-pieces 64, 66, defining an aperture 65 through which cable may pass from the first surface of the frame to the second surface of the frame. Inner leg 60 mounts to enclosure 50, while outer leg 62 includes a universal mounting pattern 63 through which bolts may be used to secure the outer leg 62 to frame 20. The universal mounting pattern 63 allows for mounting to any standard frame 20, including EIA/TIA and WECO frames, and allows the field technician to mount the enclosures 50 with minimal gaps therebetween, allowing the enclosures 50 to be secured to the frame at the highest possible density. In the preferred embodiment shown in FIG. 4, aperture 65 is equipped with bend radius control fittings 68, 70 to control the bending of cable passing therethrough. In this preferred embodiment, the bend radius control fittings are curved members that function to create a gradual directional transition in cable upon which a direction change is imposed as, for example, when cable that is traversing a system 10 in a horizontal direction is routed vertically.

Referring again to FIGS. 1 and 2, secured to and between the sidewalls 22, 24 is a first trough assembly 30 and, preferably, a second trough assembly 40 for carrying cables that traverse the frame 20 horizontally. Each trough assembly 30, 40 includes a floor 32, 42 and a first and second trough flange 34, 36 and 44, 46 to secure the cables within upper and lower main cable troughs 35, 45 on the first surface of the system 10 and upper and lower main cable troughs 37, 47 on the second surface of the system 10. The four main cable troughs 35, 45 and 37, 47 define, with similar cable troughs on adjacent systems 10, four primary horizontal cable pathways for carrying cable traversing the system 10 horizontally. The cable trough assemblies 30, 40 include a central opening 29, 39 that allows for the passage of cable through the frame 20, allowing cable to be routed between any of the four primary horizontal cable pathways. In order to prevent excessive bending of cable passing through the central opening 29, 39, the cable trough assemblies 30, 40 include bend radius control fittings 31, 33, and 41, 43. A plurality of transverse cable troughs 49 are spaced vertically upwards along the second surface of the system 10, defining, with similar transverse troughs on adjacent systems 10 a plurality of secondary horizontal cable pathways.

Figure 5:
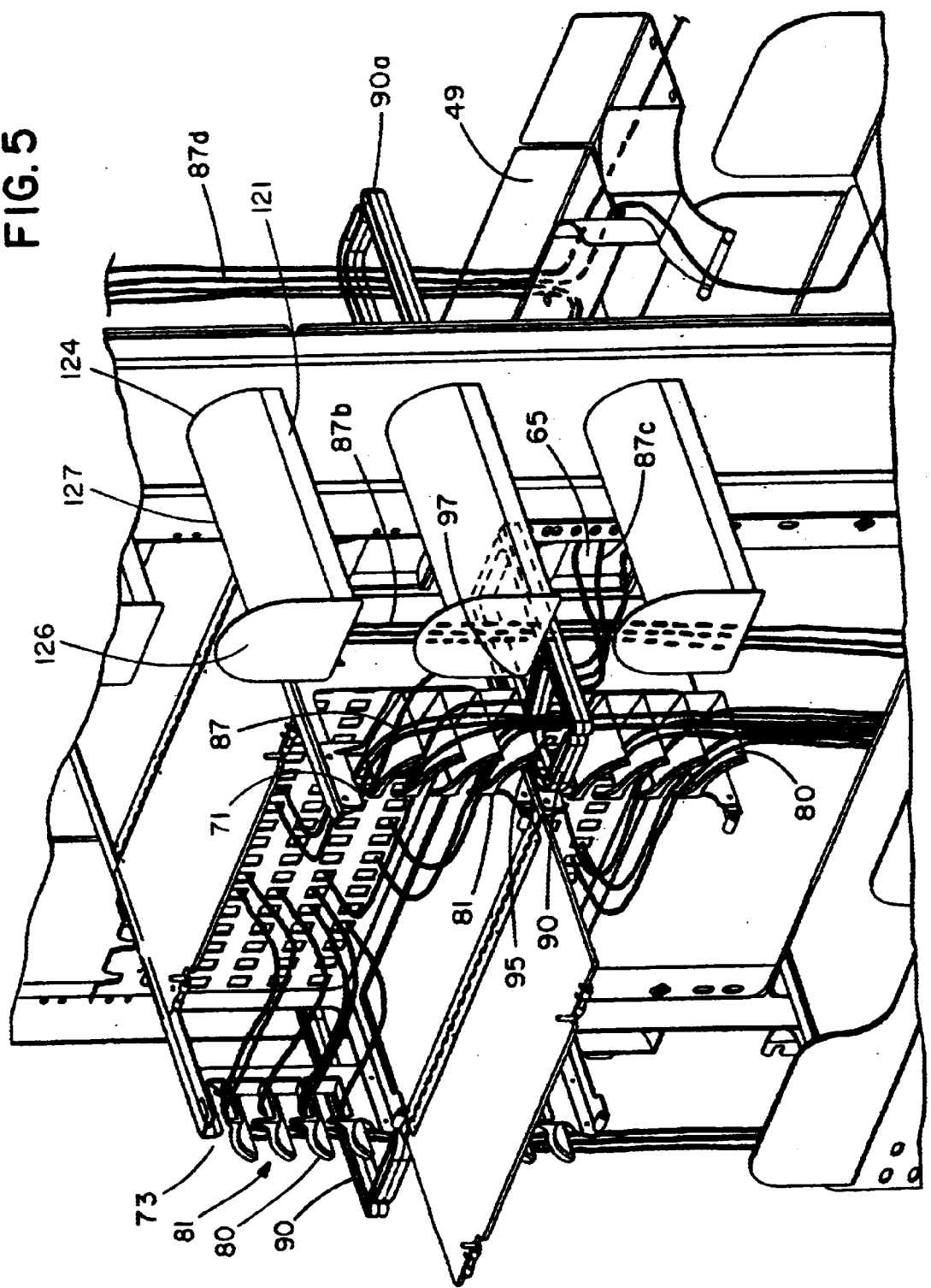
FIG. 5 is a perspective view illustrating the cable pathways of the invention.
Figure 6:
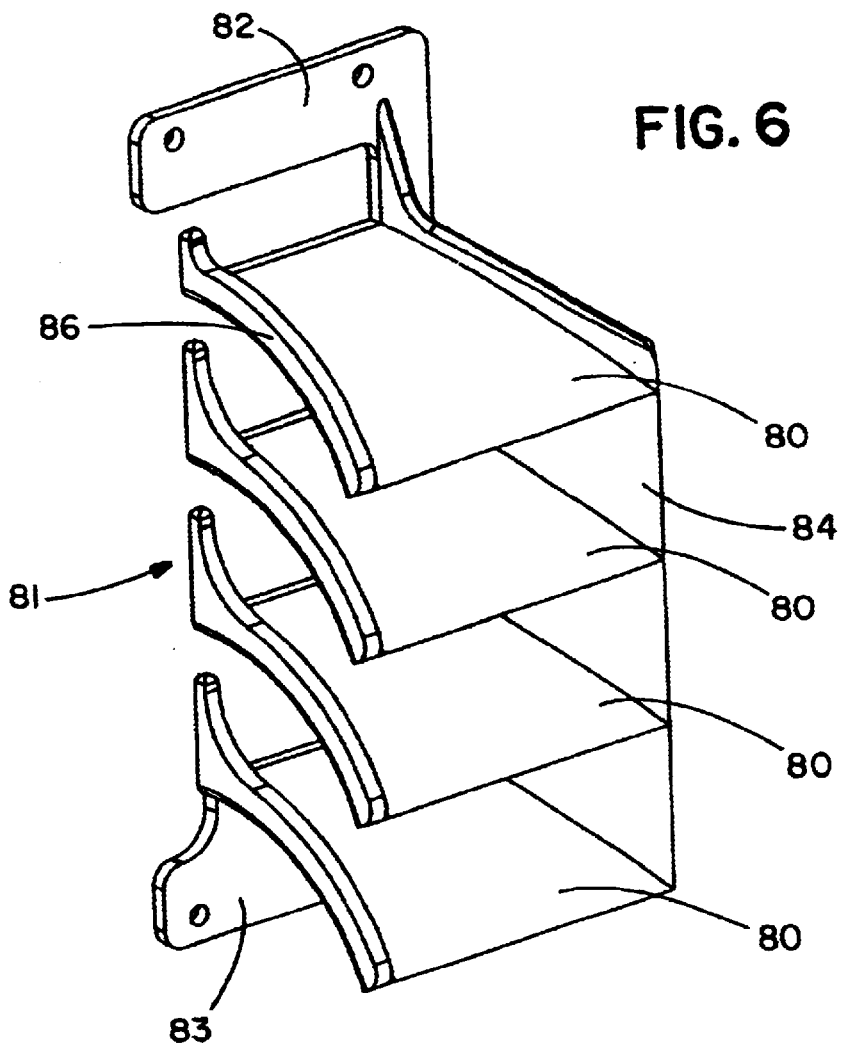
FIG. 6 is a perspective view of a fanning guide array.

Referring to FIGS. 5 and 6, cable 87 that terminates in an enclosure 50, is directed downward in the direction of the primary cable pathways through a primary vertical cable pathway on the first surface of the system 10. As the cable 87 emerges from the enclosure 50 through opening 71 or 73, it is directed over a fanning guide 80 that acts to control the bend radius of the cable as it is directed downwards and to control the placement of the cable into the vertical cable management system. A series of fanning guides 80 forming a fanning guide array 81 is secured to the side walls 53, 55 of the enclosure 50, adjacent openings 71, 73. A fanning guide array 81 is shown in FIG. 6, comprising a plurality of fanning guides 80, with a peripheral wall 84 and first and second mounting rails 82, 83. In a preferred embodiment, the peripheral wall 84 curves away from the fanning guides, and the mounting rails 82, 83 are plates that bolt onto the sidewalls 53, 55 of the enclosure 50. Each fanning guide 80 includes an edge flange 86 located on an edge of the fanning guide 80 opposite the peripheral wall 84 to prevent cable passing over the fanning guide 80 from slipping off the fanning guide 80.

Figure 7:
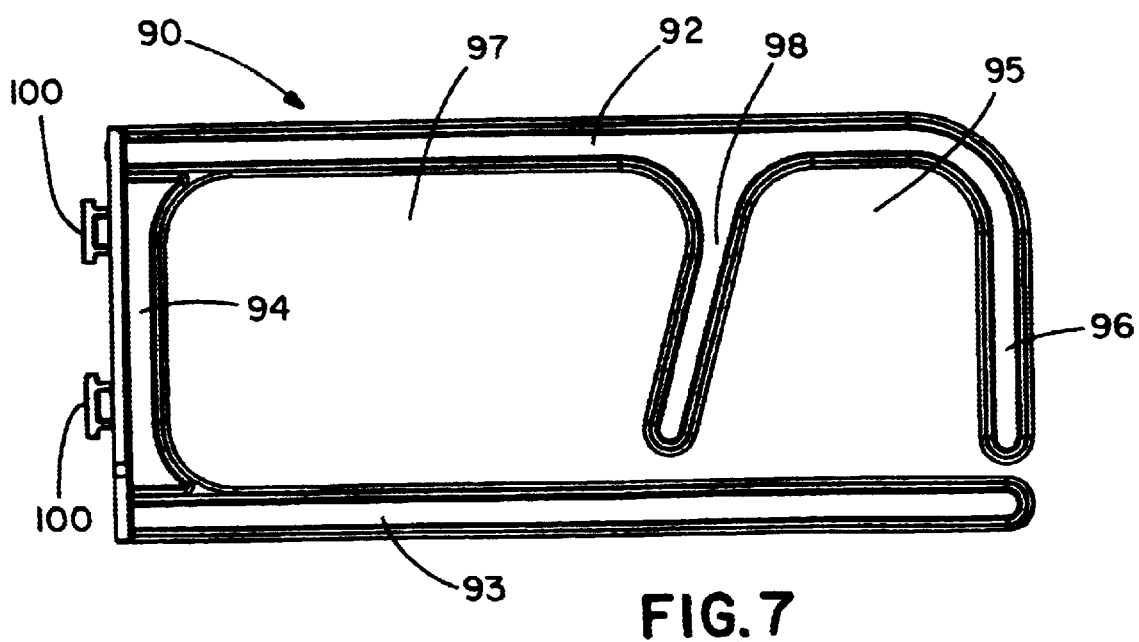
FIG. 7 is a perspective view of a cable management ring.

Referring now to FIGS. 1, 5 and 7, the vertical cable pathway is defined by a plurality of cable rings 90. Although the cable rings 90 could be simple ring-shaped members defining a single channel, in a preferred embodiment, the cable rings 90 are in the form depicted in FIG. 7, wherein the cable ring 90 includes first and second legs 92, 93, connected by an end wall 94. First leg 92 includes a terminal projection 96 and an intermediate projection 98, defining first and second channels 95, 97.

In a preferred embodiment, shown in FIG. 7, the intermediate projection 98 is slightly inclined toward the end wall 94 and away from the terminal projection 96, although the intermediate projection 98 could be parallel to the terminal projection 96. Mounting means 100 are positioned on the end wall 94. In a preferred embodiment, cable ring 90 is attached to each enclosure mounting bracket 52, 54, locating the cable ring 90 adjacent the enclosure 50, with the first channel 95 located adjacent the fanning guide array 81. Alternatively, the cable rings 90 could be attached directly to the frame 20 or to any convenient anchor site. Typically, the cable rings 90 are spaced at intervals along the frame 20 to coincide with the spacing of the enclosures 50 stacked along the frame 20, adjacent the openings 71, 73 in the sidewalls 53, 55 of each enclosure 50. Accordingly, a primary vertical cable pathway is defined by a plurality of stacked cable rings 90 located on both sides of the enclosures 50, that is, positioned adjacent both sidewalls 53, 55 of each enclosure 50. This is necessary so that cable, may enter or exit the enclosure 50 through either opening 71 or 73, increasing the efficiency of cable routing. Cable passing over the fanning guide array 81 is directed downwards into the first channel 95. As the cable continues downwards through a plurality of vertically stacked cable rings 90, the accumulating cables may be routed behind intermediate projection 98 into the second channel 97.

A secondary vertical cable pathway may be included, defined by a second plurality of cable rings 90a spaced vertically along the frame 20 on the second surface of the system 10 to control and route cable routed vertically to the secondary cable pathways defined by the transverse cable troughs 49. As with the primary vertical cable pathway, a secondary vertical cable pathway is defined on both sides of the enclosures 50, i.e., adjacent the sidewalls 53, 55 of the enclosures 50, on the second surface of the system 10. FIG. 5 also shows the interaction of the vertical and horizontal cable pathways to carry and direct cable 87 emerging from the enclosure 50. As cable 87 emerges from the enclosure 50 it is directed over the fanning guides. 80 of a fanning guide array 81, thereby providing bend radius control as the cable 87 is routed downwards toward the primary horizontal cable pathways. As the cable 87 leaves the fanning guides 80 the cable 87 is collected and controlled by cable ring 90, passing through the first channel 95 thereof. Cable 87b from enclosures 50 secured higher on the frame 20 passes through second channel 97. Additionally, some cable 87c is routed through aperture 65 in mounting bracket 52, to the secondary horizontal cable pathway defined by transverse cable trough 49. Furthermore, cable 87d is vertically routed between different transverse cable troughs 49 through a secondary vertical cable pathway defined by a second plurality of rings 90a, located on the second surface of the system 10.

Figure 8:
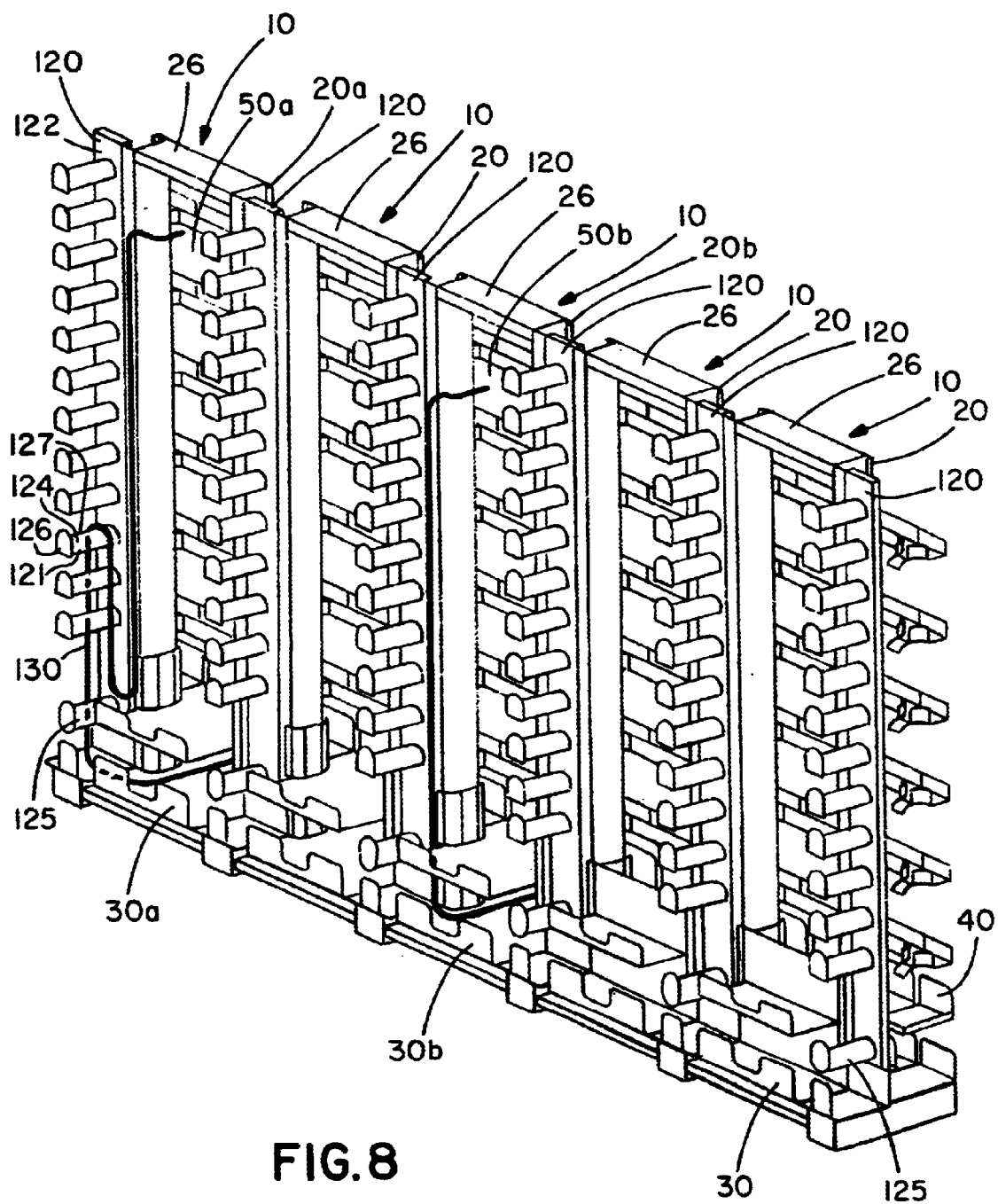
FIG. 8 is a perspective view of a series of cable management systems according to the invention.
Figure 9:
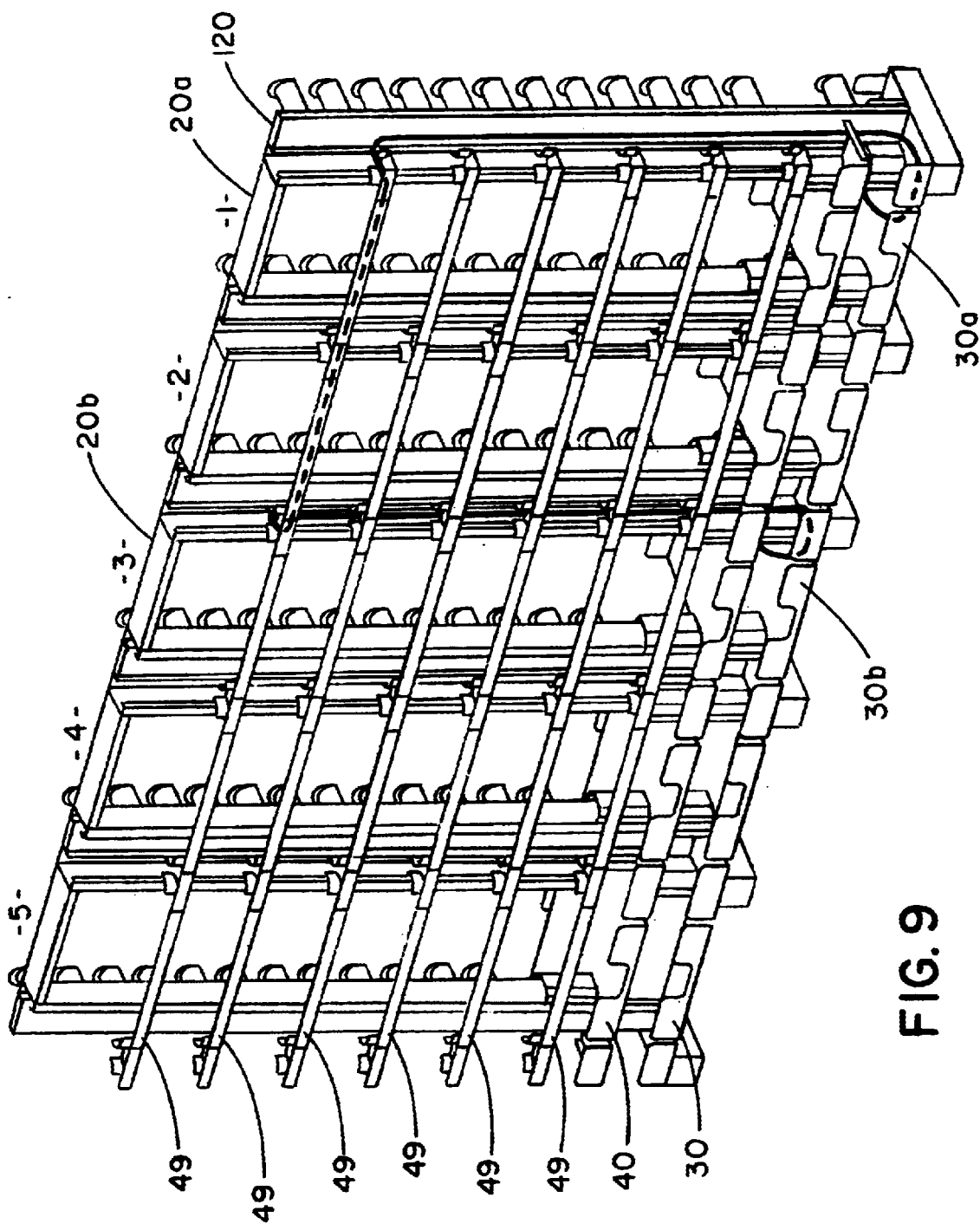
FIG. 9 is a perspective view of a series of cable management systems according to the invention.

In practice, a series of systems 10 are installed side-by-side, as depicted in FIGS. 8 and 9, which illustrate the multiple cable pathway options made possible by the various horizontal and vertical cable pathways of the system. FIG. 8, depicting the first surface of a series of cable management systems 10 as they would be installed on-site, shows the primary cable troughs 35, 37 and 45, 47 aligned horizontally with similar cable troughs on adjacent systems to define upper and lower primary horizontal cable pathways on, respectively, the first and second surfaces of the system 10. Likewise, FIG. 9, depicting the second surface of a series of cable management systems 10 as they would be installed on-site, illustrates how the plurality of transverse cable troughs 49 are horizontally aligned with similar transverse cable troughs 49 on adjacent systems 10, defining a plurality of secondary horizontal cable pathways traversing the second surface of the system 10. Cable may pass through the central openings 29, 39 in the cable trough assemblies 30, 40 allowing cable to be routed to and from any of the primary or secondary horizontal cable pathways on the first and second surfaces of the system 10. The aperture 65 in the mounting brackets 52, 54 allows cable that terminates in a given enclosure 50 to be passed through the aperture to the second surface of the system 10 and routed horizontally along one of the multiple secondary horizontal cable pathways defined by the transverse cable troughs 49. The combination of the four primary horizontal cable pathways and the multiple secondary horizontal cable pathways, interconnected by the primary and vertical cable pathways and the aperture 65 and trough assembly openings 29, 39 provide a great many options for routing cable, enabling the system to carry and manage a very high density of cables with minimal cable congestion.

Figure 10:
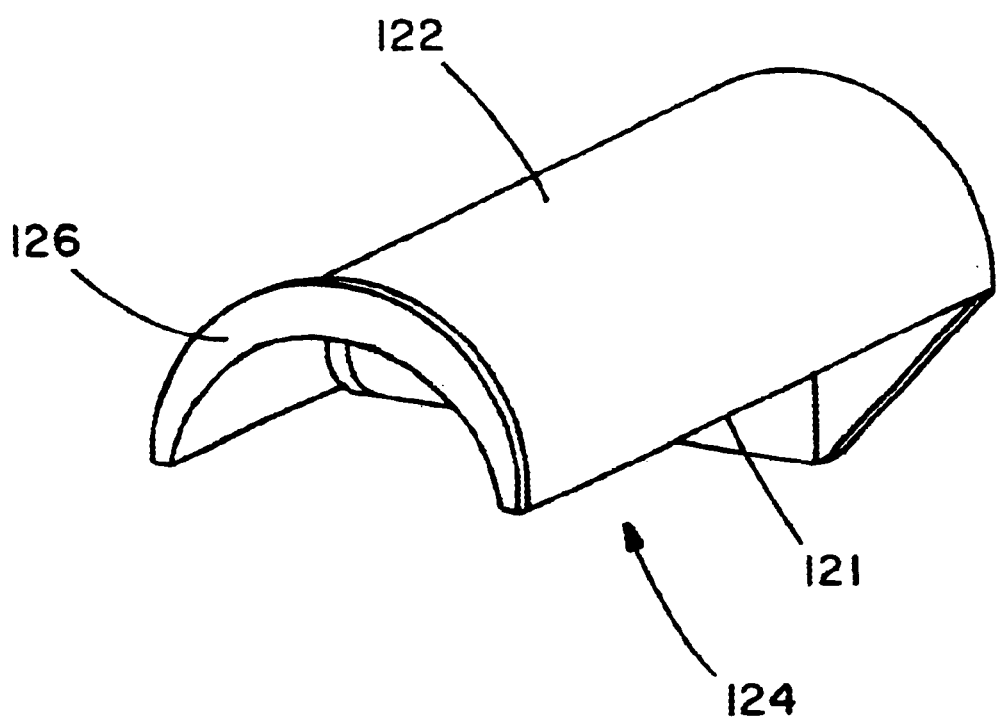
FIG. 10 is a detailed view of a slack management spool according to the invention.

The cable management system 10 preferably includes a slack cable management system 120, a preferred embodiment of which is illustrated in FIGS. 1, 2, 5, 8 and 9. In a preferred embodiment, the slack management system 120 includes a slack management panel 122, secured to the frame 20, preferably between adjacent systems, as depicted in FIG. 8. Locating the panel 122 between each of the adjacent systems 10, as illustrated in FIG. 8, insures that the slack management system 120 will be located close to the termination points of both ends of a fiber optic cable traversing the systems. In a preferred embodiment, the panel is approximately 5 inches wide. A plurality of slack management spools 124 are secured to the slack management panel 122 and are used to hold loops of slack cable, although, alternatively, the spools could be secured directly to the frame 20. The slack management spools 124 have an elongate, substantially half-cylindrical shaft 121, having a curved upper surface 127 for contacting the cable. Typically, the spools 124 have a radius of about 1.5" to impart bend radius control to prevent excessive bending of the loop of slack cable passing over the spool 124, since excessive bending of fiber optic cable may cause cable breakage and will, over time, damage the cable and overall performance of the cable. The combination of the curved cable contacting surface 127, and the substantially half-cylindrical shaft create a substantially semi-circular or crescent-shaped cross-section, as shown in FIG. 10. The half-cylinder shape of the slack management spool 124 provides greater clearance for cable passing over the slack management spool 124 immediately below, thereby allowing the center-to-center distance between spools 124 to be decreased without impairing the ability of a field technician to access the cable looped over a given spool and without decreasing the amount of cable that may be looped over a given spool. Accordingly, more spools may be located within the same area as compared to fully cylindrical spools, thereby allowing more slack cable to be contained within the same area, allowing for higher connection density and providing more options for placement of slack cable, allowing the field technician to efficiently manage slack cable without unduly stretching the cable or creating excessively large loops of slack cable that may interfere with passage of other cable.

A main spool 125 has a fully cylindrical elongate shaft 121 to provide bend radius control for cable routed over or under the master spool 125. An end flange 126 on each slack management spool 124 and the main spool 125 prevents coils of cable from slipping off. Slack management spools 124 are spaced at regular intervals vertically along the slack management panel 122. In a preferred embodiment, slack management spools 124 are removably secured to slack management panel 122 by snap fittings that cooperate with a mounting aperture (not shown) in the slack management panel 122, although any conventional means of attachment may be used to secure the slack management spools 124 to the slack management panel 122.

FIGS. 8 and 9 illustrate the operation of the cable management system 120, showing a cable 130 emerging from an enclosure 50a located on frame 20a, passing downwards and looping upwards over a slack management spool 124, passing downwards and under the master spool 125, through trough assembly 30a, then upwards to transverse trough 49, along transverse trough 49 to frame 20b, downwards to and through trough assembly 30b and upwards to enclosure 50b.

Preferred embodiments of the present invention have been described herein. It is to be understood that modifications and changes can be made without departing from the true scope and spirit of the invention, as defined by the following claims which are to be interpreted and understood in view of the foregoing.

I claim:
1. A slack cable management system, comprising:
   a panel secured to a telecommunications network rack having a plurality of enclosures vertically spaced therein and located adjacent at least one network rack;
   a vertical cable pathway for routing cables vertically adjacent the enclosures;
   a plurality of spools located adjacent the cable pathway and spaced vertically at intervals along the length of the panel for receiving slack cable, the cable pathway located between the enclosures and the spools;
   the spools having a substantially half-cylindrical elongate shaft to provide horizontal cable bend radius control for slack cable passing over the spools and an end flange.
2. The slack cable management system of claim 1, wherein the shafts of the spools have a curved upper, cable contacting surface to provide horizontal cable bend radius control.
3. The slack cable management system of claim 1, further comprising a main spool having a cylindrical shaft to provide bend radius control for cable contacting the main spool.
4. The slack cable management system of claim 1, wherein the enclosures are selected from the group consisting of a patch panel, a splice drawer and a connector module.
5. A slack cable management system, comprising:
   a network rack having a plurality of enclosures vertically spaced therein, the network rack having two sidewalls;
   a vertical cable pathway for routing cables vertically adjacent one of the sidewalls;
   a plurality of spools located adjacent the cable pathway and secured vertically at intervals along the length of at least one sidewall for receiving slack cable, the cable pathway located between the enclosures and the spools;
   the spools having a substantially half-cylindrical elongate shaft to provide horizontal cable bend radius control for slack cable passing over the spools and an end flange.
6. The slack cable management system of claim 5, wherein the enclosures are selected from the group consisting of a patch panel, a splice drawer and a connector module.
7. A slack cable management system, comprising:
   a panel secured to a telecommunications network rack having a plurality of enclosures vertically spaced therein and located adjacent at least one network rack;
   a vertical cable pathway for routing cables vertically adjacent the enclosures;
   a plurality of spools located adjacent the cable pathway and spaced vertically at intervals along the length of the panel for receiving slack cable, the cable pathway located between the enclosures and the spools;
   the spools having an elongate shaft, the shaft having a curved, upper surface to provide horizontal cable bend radius control for slack cable passing over the spools, wherein a portion of the shaft is removed longitudinally, opposite the curved upper surface, to create a substantially semi-circular shaft cross-section.
8. The slack cable management system of claim 7, further comprising a main spool having a shaft with a circular cross-section to provide bend radius control for cable contacting the main spool.
9. The slack cable management system of claim 7, wherein the enclosures are selected from the group consisting of a patch panel, a splice drawer and a connector module.

* * * * *